US012005694B2

(12) United States Patent
Cerciello

(10) Patent No.: US 12,005,694 B2
(45) Date of Patent: Jun. 11, 2024

(54) PRINTING DEVICE FOR A COUPLING MACHINE

(71) Applicant: NORDMECCANICA S.P.A., Piacenza (IT)

(72) Inventor: Vincenzo Cerciello, Piacenza (IT)

(73) Assignee: NORDMECCANICA S.P.A., Piacenza (IT)

( * ) Notice: Subject to any disclaimer, the term of this patent is extended or adjusted under 35 U.S.C. 154(b) by 0 days.

(21) Appl. No.: 17/612,632

(22) PCT Filed: May 19, 2020

(86) PCT No.: PCT/IB2020/054731
§ 371 (c)(1),
(2) Date: Nov. 19, 2021

(87) PCT Pub. No.: WO2020/234764
PCT Pub. Date: Nov. 26, 2020

(65) Prior Publication Data

US 2022/0219444 A1 Jul. 14, 2022

(30) Foreign Application Priority Data

May 20, 2019 (IT) ........................ 102019000007024

(51) Int. Cl.
*B41F 13/30* (2006.01)
*B41F 5/24* (2006.01)

(52) U.S. Cl.
CPC ................ *B41F 13/30* (2013.01); *B41F 5/24* (2013.01)

(58) Field of Classification Search
CPC .......... B41F 13/30; B41F 5/24; B41F 31/307; B41F 31/027; B41F 31/06; B41F 13/0045;

(Continued)

(56) References Cited

U.S. PATENT DOCUMENTS 5,692,442 A 12/1997 Leanna
6,688,222 B2 2/2004 Cattaruzza et al.
(Continued)

FOREIGN PATENT DOCUMENTS

EP 2 620 282 7/2013
KR 10-0876666 1/2009

OTHER PUBLICATIONS

International Search Report for PCT/IB2020/054731 dated Aug. 26, 2020, 5 pages.

(Continued)

*Primary Examiner* — Matthew G Marini
*Assistant Examiner* — Leo T Hinze
(74) *Attorney, Agent, or Firm* — NIXON & VANDERHYE

(57) ABSTRACT

Disclosed is a flexographic printing device for a laminating machine, including at least one pair of shoulders mounted on a trolley frame, a blade chamber for containing printing ink; an Anilox roller that rotates in contact with the printing ink, a print roller holding a printing cliché that rotates in contact with the Anilox roller and a counter-pressure roller that rotates in contact with the cliché held by the print roller, wherein at least the Anilox roller and the print roller are supported by respective supports that can slide with respect to the shoulders in a direction substantially orthogonal to their axes, the printing device also including at least one first motor for rotating the Anilox roller, at least one second motor for rotating the print roller and possibly a third motor for rotating the counter-pressure roller.

9 Claims, 10 Drawing Sheets

(58) Field of Classification Search
CPC ........ B41F 13/14; B41F 13/38; B41F 27/105; B41P 2213/126; B41P 2217/11; B41P 2227/21; B41P 2217/15
See application file for complete search history.

(56) References Cited

U.S. PATENT DOCUMENTS

| | | | | |
|---|---|---|---|---|
| 7,284,483 | B2 * | 10/2007 | Bachmeir | B41F 31/302 101/DIG. 35 |
| 2005/0257704 | A1 | 11/2005 | Pas et al. | |
| 2010/0122638 | A1 | 5/2010 | Schneider et al. | |

OTHER PUBLICATIONS

Written Opinion of the ISA for PCT/IB2020/054731 dated Aug. 26, 2020, 6 pages.

* cited by examiner

PRINTING DEVICE FOR A COUPLING MACHINE

CROSS-REFERENCE TO RELATED APPLICATIONS

This application is the U.S. national phase of International Application No. PCT/IB2020/054731 filed May 19, 2020 which designated the U.S. and claims priority to IT Patent Application No. 102019000007024 filed May 20, 2019, the entire contents of each of which are hereby incorporated by reference.

BACKGROUND OF THE INVENTION

Field of the Invention

The present invention relates to a printing device for printing on a sheet of material, in particular a movable-type printing device to be used in associated with a laminating machine.

Description of the Related Art

Flexographic printing machines used to print single layer or laminated sheet materials of various types, prevalently used in the industrial packaging and paper converting sector, are well known.

One type of widely used flexographic printing machine generally comprises a central drum around which a plurality of independent printing units are arranged.

The material to be printed in the form of a continuous film is unwound from a first reel, guided in contact with at least one portion of the surface of the drum and is rewound onto a second reel. In the segment in which it is in contact with the drum, the film passes through one or more printing units which, in general, carry out partial printing on the surface of the film. In general, each printing unit is associated with a given colour so that the sum of several partial one-color prints carried out in sequence on the film by the various printing units gives rise to the final graphics of the print.

Another type of flexographic printing machine comprises a plurality of independent printing units arranged consecutively one after another along a path that extends horizontally, vertically or in a horseshoe.

In this case, each printing unit comprises a counter-pressure roller that performs the function of supporting and contacting the film like the central drum of the first type described.

These known machines are generally somewhat complex, cumbersome and costly. Moreover, preparing and setting up the machine for a new printing process requires a considerable amount of time. Therefore, these flexographic machines are used profitably to carry out complex printing processes, using several colours and for large production batches.

Films printed with these machines can be used directly as end product or can be used as semi-finished product to produce multi-layer films laminated by means of laminating machines.

Especially in the packaging sector, a company that produces multi-layer films consisting of two or more layers of laminated film, in addition to the process of laminating and joining of the films, must also carry out partial printing or “reprinting” on at least one of said films, for example to complete parts of the graphics or to insert writing or information in given areas of the film.

For printing operations of this type, typically simple, one-color and on surfaces of limited size, the use of a flexographic printing machine is not justified in relation to costs (whether for the possible purchase by the company or for third party printing) and times, required to set up and prepare the machine.

For this reason, in cases such as the one described above, movable-type printing devices, also called “printing trolleys” can be used; these can be temporarily installed in a laminating machine in order to share some components normally involved in the laminating process such as unwinders, winders, guide rollers, etc. to carry out a printing process on a film.

These known printing trolleys generally comprise a blade chamber to contain the printing ink, an Anilox roller that rotates in contact with said blade chamber, a cliché roller that rotates in contact with the Anilox roller and a counter-pressure roller that rotates in contact with the cliché roller. The print medium (film) is passed between the cliché roller and the counter-pressure roller. The Anilox roller picks up a quantity of ink from the blade chamber, which remains trapped in the cells made on its surface, and transfers it to the cliché roller, which in turn, prints the film.

As the size of the print in the direction of unwinding of the film depends on the outer diameter of the printing cliché, the device must be configured to accommodate cliché rollers that have sleeves, and related printing cliché s, of different diameters. Moreover, both it and the other rollers are mounted on the structure of the trolley by means of sliding guides that allow them to be moved to adapt their position to the diameter of the cliché and, at the same time, to be held and maintained in contact with one another.

In a known type of printing trolley, manufactured and marketed by the applicant, the rotating motion to the rollers is imparted by a motor connected to all the rollers by means of a gear train connected to one end of the rollers.

Although this solution is simple, sturdy and reliable, it has some problems. In fact, as the transmission ratio between the various rollers is predetermined, all the gears of the system must be replaced each time the diameter of the printing cliché changes.

This implies an evident loss of time to prepare the device, as well as costs linked to the procurement and storage of the multiple gears.

Moreover, indirect transmission, i.e. through one or more transmission members, of motion to the rollers can cause, due to inevitable backlash and tolerances that, although minimum, are always present, vibrations that produce a deterioration in the print quality. For this reason, to minimize vibrations the rotation speed of the rollers is often limited, lengthening printing times.

SUMMARY OF THE INVENTION

In this context, the object of the present invention is to provide a flexographic printing device to be used in association with a laminating machine that overcomes the problems of the prior art set forth above.

In particular, an object of the present invention is to provide a printing device that is more efficient and less complicated to handle and adjust, with respect to those of the prior art.

Another object of the present invention is to provide a compact and light movable-type printing device, to facilitate the installation and subsequent removal operations in a laminating machine.

These objects and other objects are achieved by a movable-type flexographic printing device, adapted to be used in association with a laminating machine, in accordance with one or more of the appended claims.

According to the invention the printing device comprises at least:

- a support structure that includes at least one pair of shoulders mounted on a trolley frame;
- a blade chamber with a tank for containing printing ink;
- an Anilox roller the surface of which is facing the tank of the blade chamber so that, rotating, a quantity of ink remains adhering thereto;
- a print roller that holds a printing cliché adapted to rotate in contact with the Anilox roller so that a layer of ink is deposited onto the surface of said cliché; and
- a counter-pressure roller that can rotate in contact with the print roller.

The trolley support structure facilitates movement of the device on the ground so that it can be temporarily positioned inside a laminating machine to perform printing operations. Said support structure generally comprises wheels or other equivalent rolling means.

The Anilox roller and the print roller are each supported by a pair of supports that can slide with respect to the shoulders of the support structure along a direction substantially orthogonal to the axis of said rollers and, preferably, substantially horizontal.

According to an aspect of the invention, the printing device also comprises at least one first motor for rotating the Anilox roller, at least one second motor for rotating the print roller and possibly a third motor for rotating the counter-pressure roller.

Said third motor can be mounted on the printing device or, preferably, it is designed to connect said counter-pressure roller to a motor mounted on the laminating machine by means of a belt.

The rollers of the device are therefore motorized independently from one another. The rotation speed of each roller is therefore managed and controlled by a control unit, integrated in, or external to, the device. As a function of the diameter of the printing cliché, the control unit calculates the rotation speed of each roller for correct operation of the device and drives the related motor accordingly.

In this way, during the operations to replace the sleeve of the cliché roller with one of a different diameter, it is not necessary to act on or disassemble parts of the other rollers. This operation is therefore faster and more practical to carry out with respect to known devices.

According to another aspect of the invention, the print roller comprises a cliché-holder cylinder supported at the ends by two shafts, where at least one first shaft is stably mounted on a respective sliding support and can be coupled to the cliché-holder cylinder. The second shaft is instead preferably in one piece with the cylinder. The second motor that operates the print roller is connected to the first shaft.

In this way, when the cliché-holder sleeve must be removed to replace the printing cliché, or possibly also said sleeve, it is possible to easily remove the cliché-holder cylinder from the printing device, while leaving the first shaft and all the parts connected to or associated with it (motor, sensors, supports, etc.) fixed on the device.

According to an aspect of the invention, the second motor that operates the print roller can comprise a ring rotor fitted directly onto the first shaft and a ring stator, which wraps around the rotor, mounted fixed on the sliding support.

Typically, the rotor has permanent magnets while the stator houses the windings of conductive material.

This configuration of the device has more than one advantage. In fact, the direct coupling of the motor to the shaft, i.e., without the interposition of transmission members, such as pulleys and belts, gears or the like, makes it possible to eliminate backlash that occurs in the direction of rotation, obtaining precise phase synchronism between the motor and the print roller and, consequently, the corresponding cliché.

Moreover, positioning of the motor aligned with the shaft makes the device more compact, leaving space around the shaft of the print roller for the positioning of other parts.

Further, this configuration makes it possible to mount the motor in a point of the shaft distal from its end, leaving this latter free and accessible. As better described below, this facilitates the connection of a source of compressed air to supply air inside the print cylinder.

In fact, said print cylinder typically has an internal cavity that can be supplied with pressurized air, which can be ejected from holes produced on the wall of the cylinder in order to create an air cushion between the surface of the cylinder and that of the sleeve and thereby facilitate sliding thereof during the mounting or removal operations.

For this purpose, according to an aspect of the invention, a passage can be made in the first shaft of the print roller, which extends parallel to its axis. A first end of said passage ends at the free end of said shaft while a second end, opposite the first end, communicates with the cavity of the cylinder.

As stated above, the mounting configuration of the second motor of the print roller allows the connection of a line for conveying air to the passage in the shaft, directly at said free end, for example by means of a common axial connector of rotary type. This solution reduces the constructional complexity of known systems with aligned motor where the air can be fed into the shaft through a radial opening that requires a particular rotary seal system that must be fitted on the shaft.

According to another aspect of the invention, the print roller can be mounted on its sliding supports so as to be able to translate axially, i.e., in a direction parallel to its axis.

This axial movement is useful and necessary to carry out the calibration operations of the print position in transverse direction with respect to the direction of movement of the print medium or film. Typically, said axial, or transverse, movement, has a total amplitude ranging from 5 mm to 30 mm and more preferably from 10 mm to 20 mm. In general, this movement is a movement away from a neutral central position and can thus be quantified from ±2.5 mm to ±15 mm, preferably from ±5 mm to ±10 mm from said neutral position.

According to this variant, the printing device further comprises a position adjustment system adapted to control the movement of said print roller in said direction of axial translation.

According to a possible embodiment, said position adjustment system comprises a motor, preferably electric, connected to a control member movable along a direction parallel to the axis of the print roller.

Typically, a transmission system, for example comprising belts and pulleys, recirculating ball screws, gears or a combination of two or more different systems from those cited or other equivalent systems, is interposed between the motor and control member.

The control member engages an insert in one piece with the first shaft of the print roller, preferably made with it, to move it along the aforesaid axial direction.

Said insert, for example, is disc or annular shaped and projects radially from the surface of the shaft. The control member is cradle or jaw shaped and has a seat in which at least one part of the insert is housed.

This configuration marginally influences the axial dimensions of the shaft, as the moving member and the jaw can have a width, in axial direction, of a few millimetres. This is particularly advantageous as the printing device of the present invention must be able to be housed inside a laminating machine, more precisely between its shoulders, in place of a conventional glue spreading trolley.

The jaw preferably comprises contact elements that remain substantially in contact with respective opposite faces of the insert. These contact elements allow the axial position of the shaft to remain stable during operation of the device, and control of the movement of said shaft along the axial direction. Said contact elements are preferably rolling means, such as wheels, bearings or the like, mounted in the seat of the jaw.

In this way it is possible to hold said contact elements pressed against the insert to eliminate, or minimize, axial backlash of the shaft and ensure the stability of the axial position during operation, without causing premature wear of the parts in contact and without affecting the rotation of the print cylinder.

According to another aspect of the invention, the second motor that operates the print roller is equipped with a rotor whose active part has a length, i.e. an extension in the axial direction, greater than that of the stator. Therefore, according to a preferred variant, the section of the rotor that houses the permanent magnets has an extension greater than that of the section of the stator occupied by the windings that generate the magnetic field. Typically, the extension of the rotor is greater than that of the stator by a length at least equal to, or preferably greater than, the axial movement of said rotor with respect to the stator.

In this way the magnetic field of the motor is not influenced by the axial movement of said print roller, and consequently of the rotor, delivering the rated torque.

According to another aspect of the invention the sliding supports are connected to the respective shoulders of the device, each by means of a pair of sliding guides. In this way the structure is stiffer, thus ensuring greater positioning precision of the rollers. According to a preferred variant, each shoulder is provided with a pair of guides on which the supports of the Anilox roller, of the respective blade chamber, and of the print roller, slide.

BRIEF DESCRIPTION OF THE DRAWINGS

Further features and advantages of the present invention will be more apparent from the description of a preferred but not exclusive example of embodiment of an apparatus for producing a multi-layer film, as illustrated in the accompanying figures, wherein.

DESCRIPTION OF THE PREFERRED EMBODIMENTS

Figure 1A:
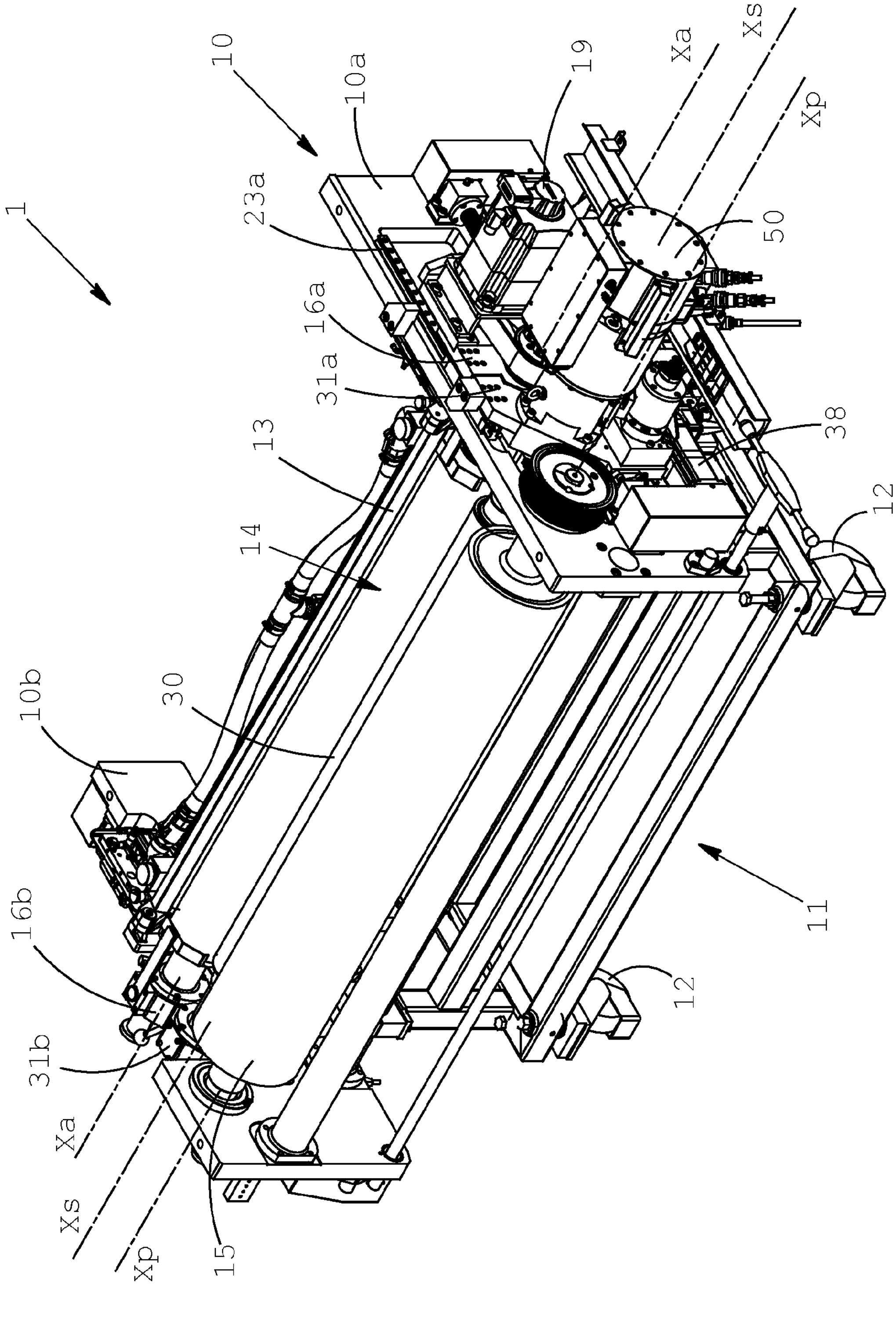
FIGS. 1*a* and 1*b* are two perspective views of the printing device according to the present invention.
Figure 1B:
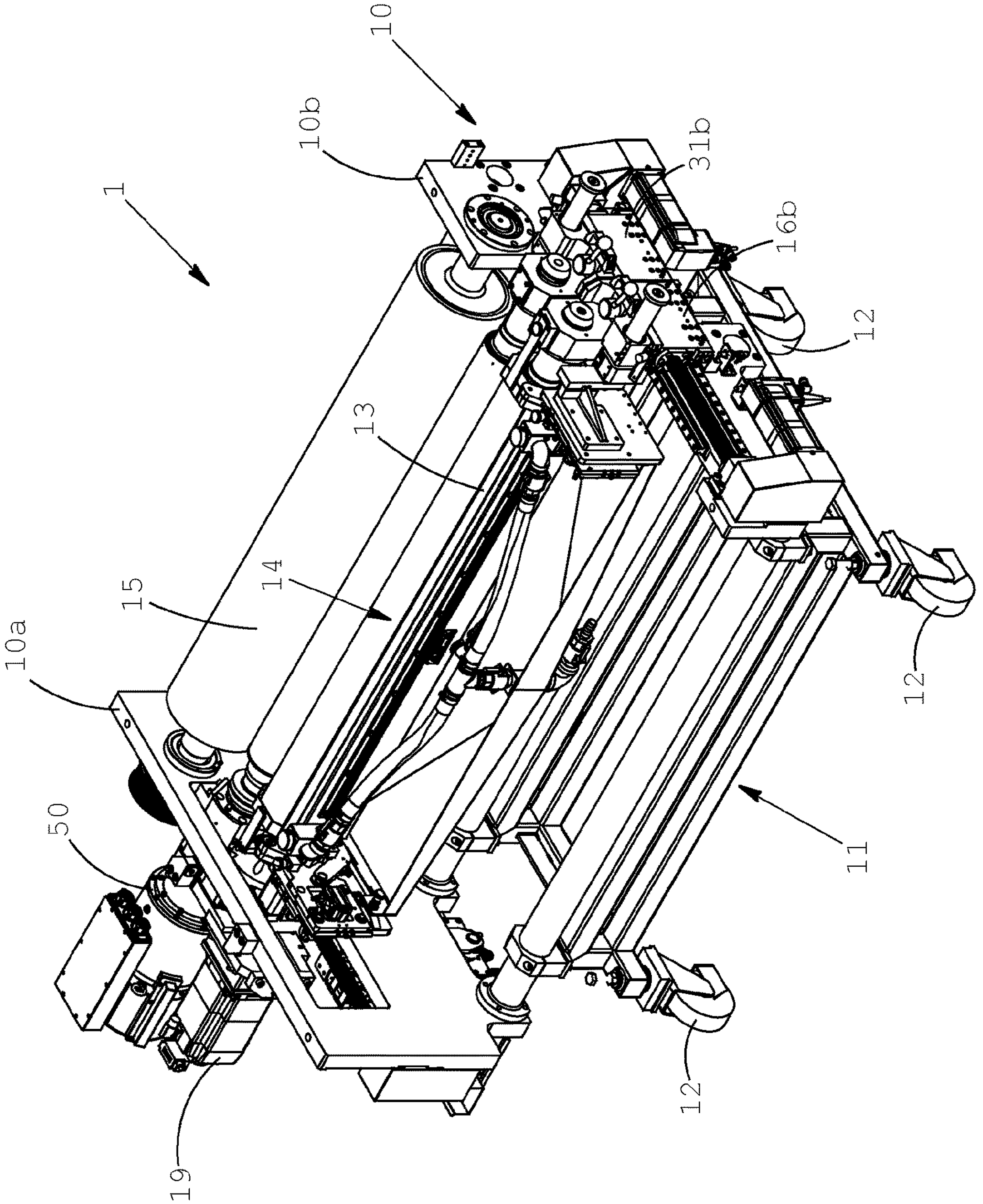
Figure 2:
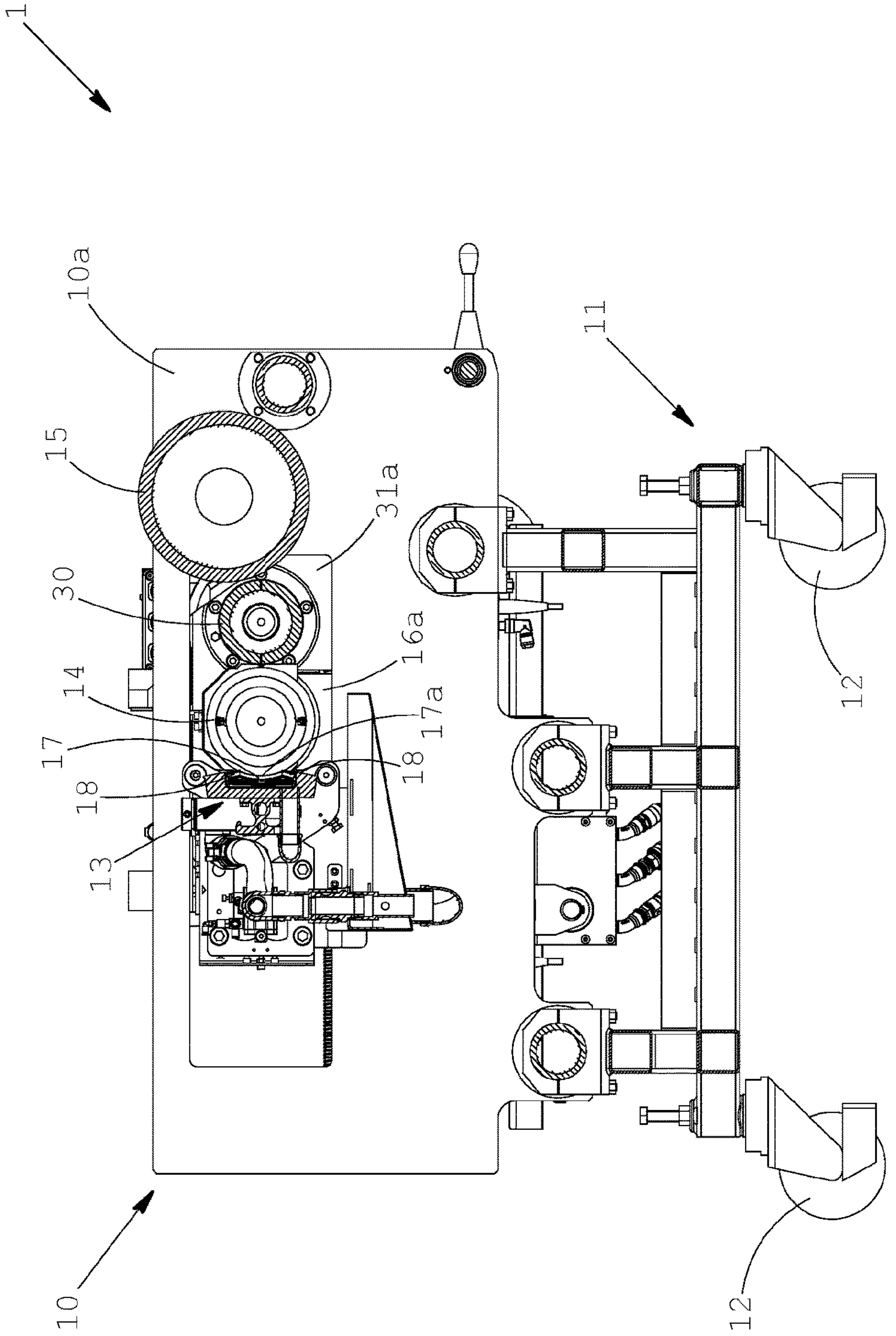
FIG. 2 is a view of the device according to the invention, sectioned along a vertical plane orthogonal to the axes of the rollers.
Figure 3A:
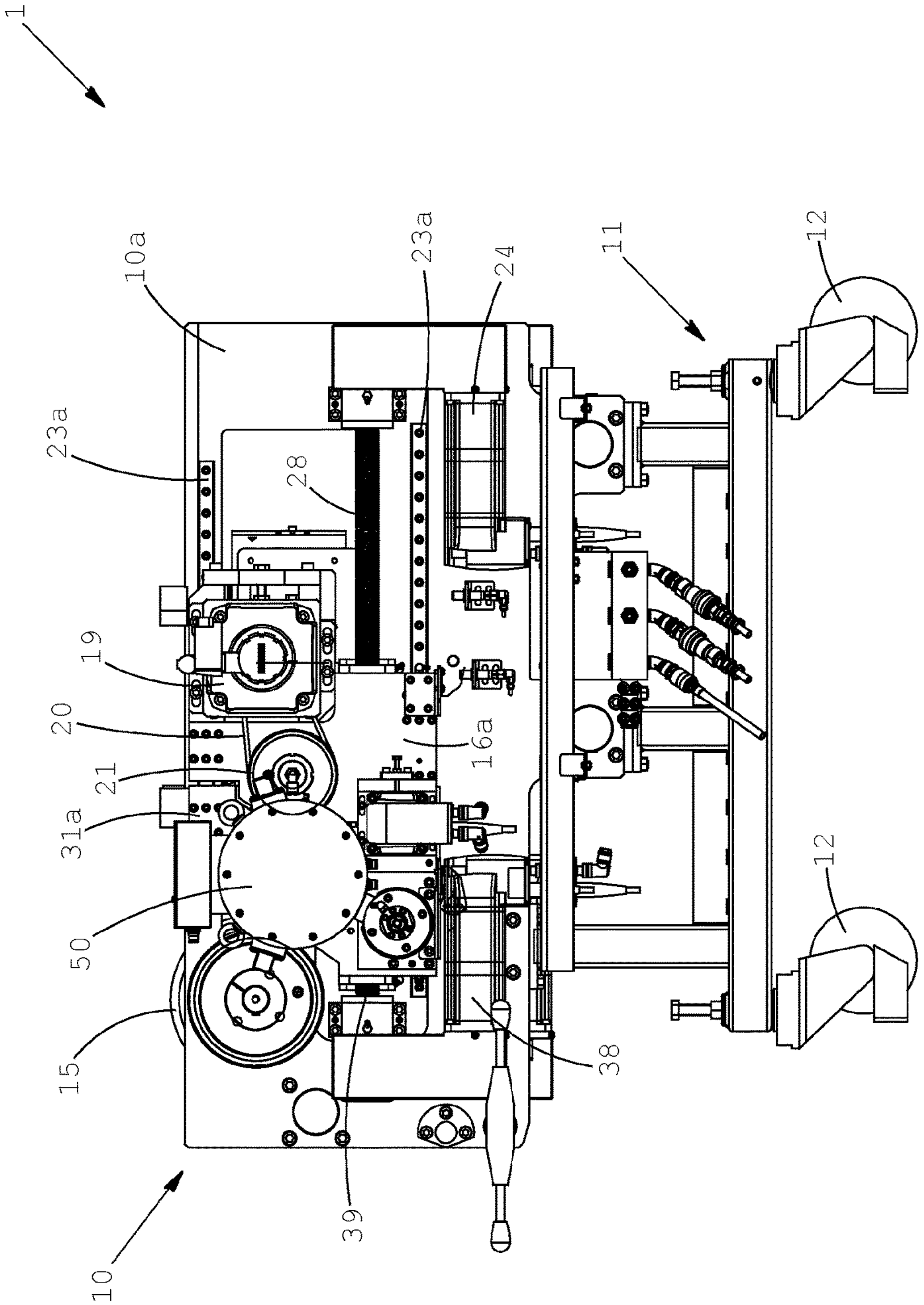
FIGS. 3*a* and 3*b* are two side views, respectively from opposite sides, of the device according to the present invention.
Figure 3B:
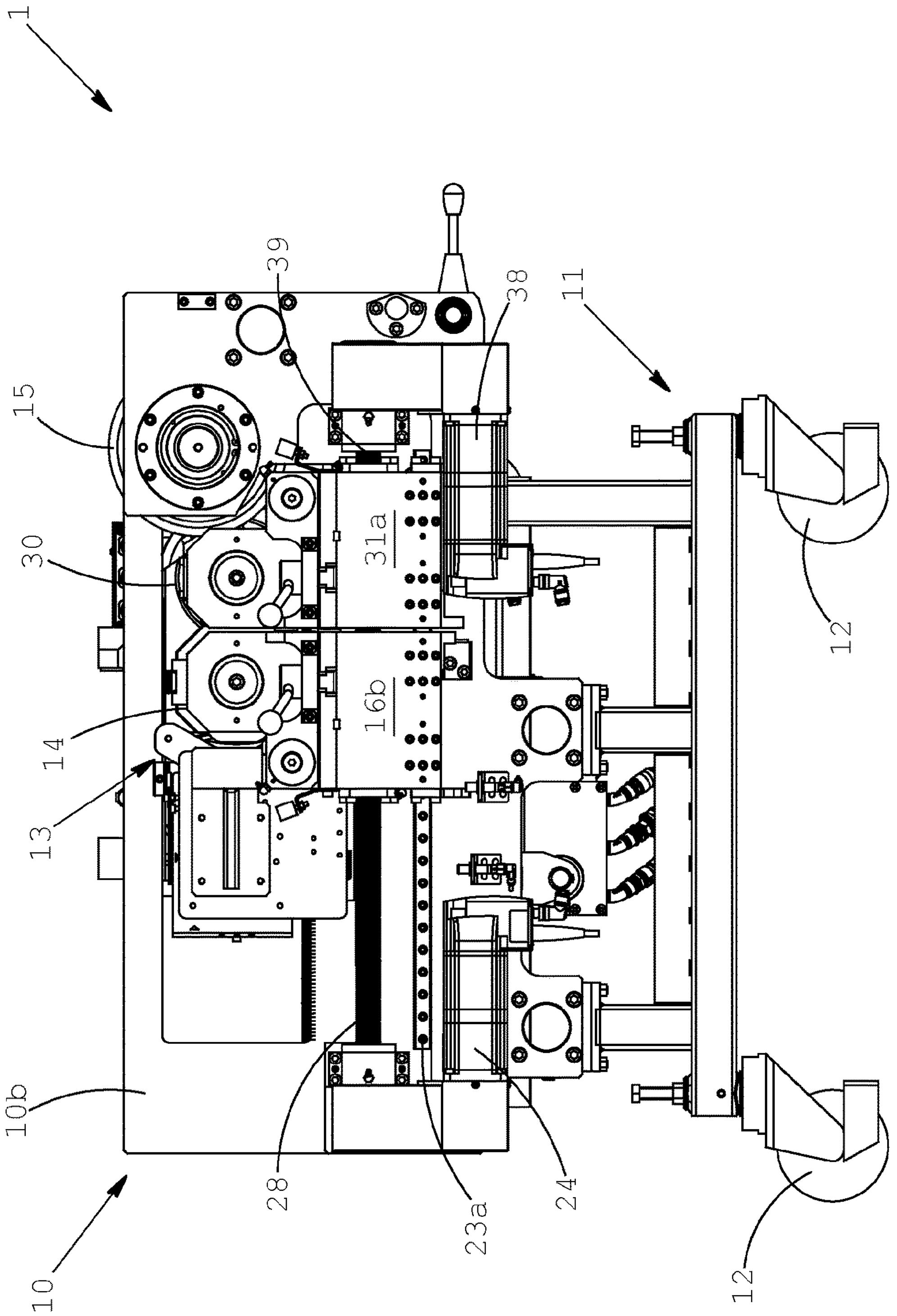
Figure 4A:
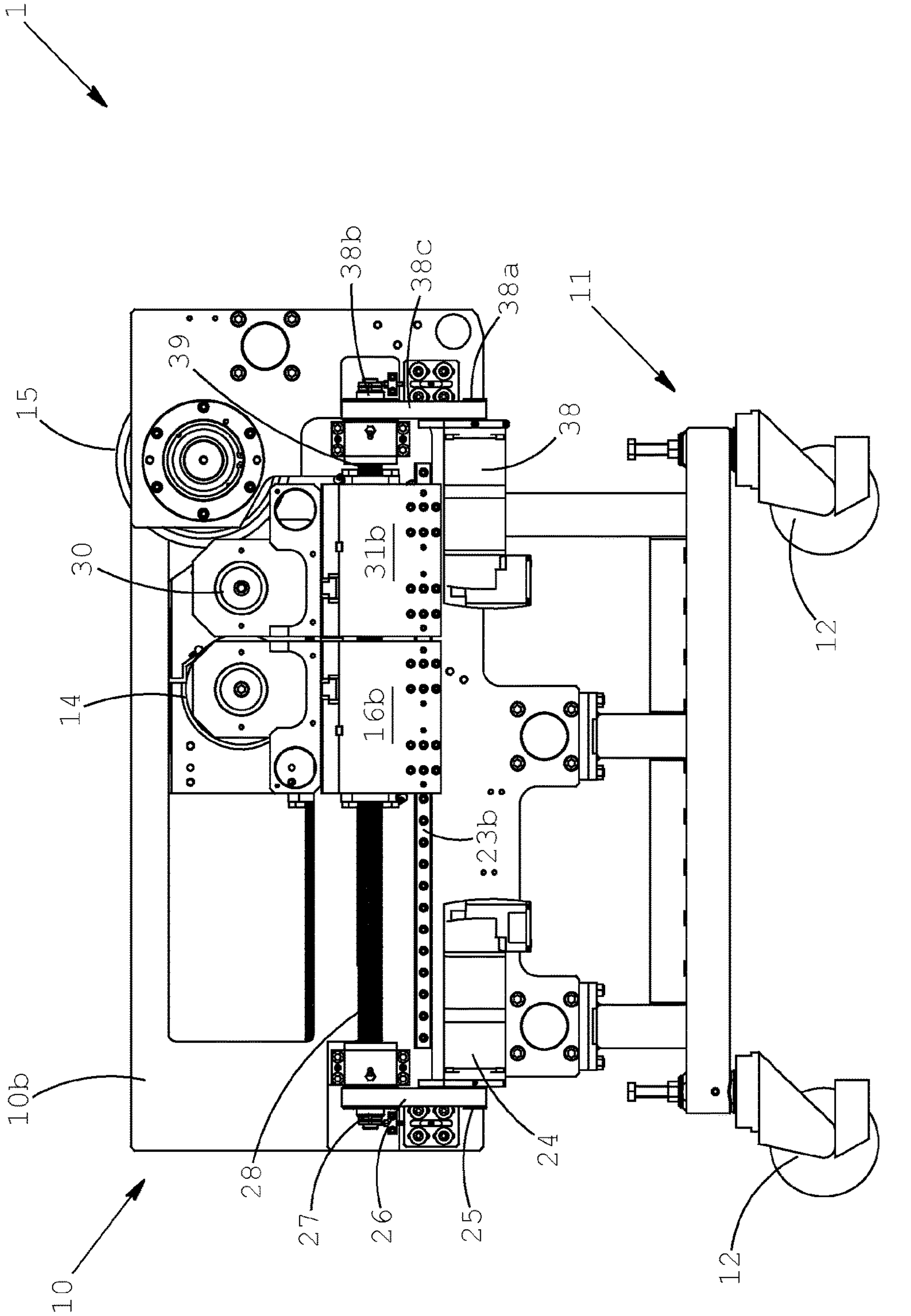
FIGS. 4*a* and 4*b* are two side views, respectively of opposite sides, of the device of FIGS. 3*a* and 3*b* partially disassembled.
Figure 4B:
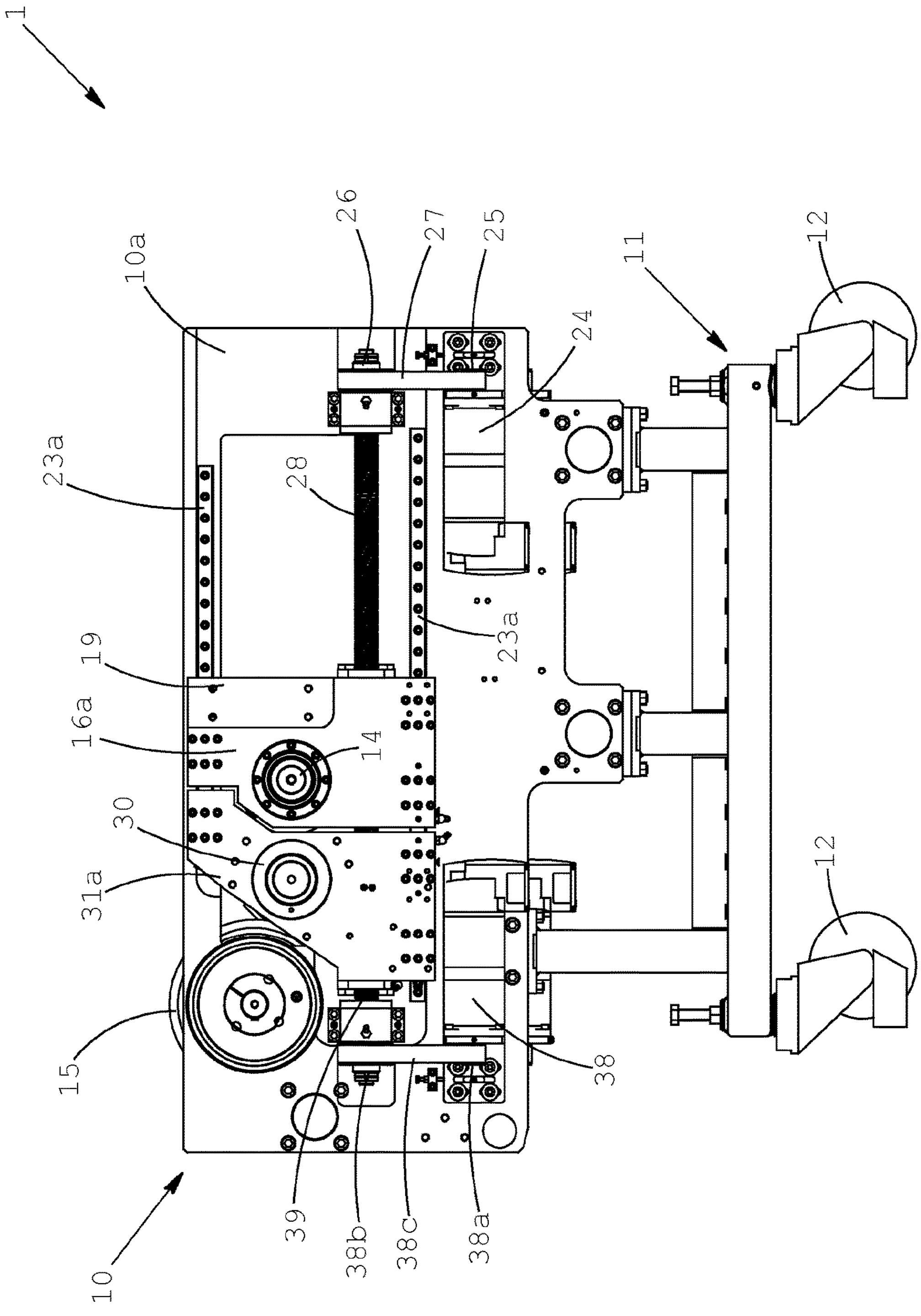
Figure 7:
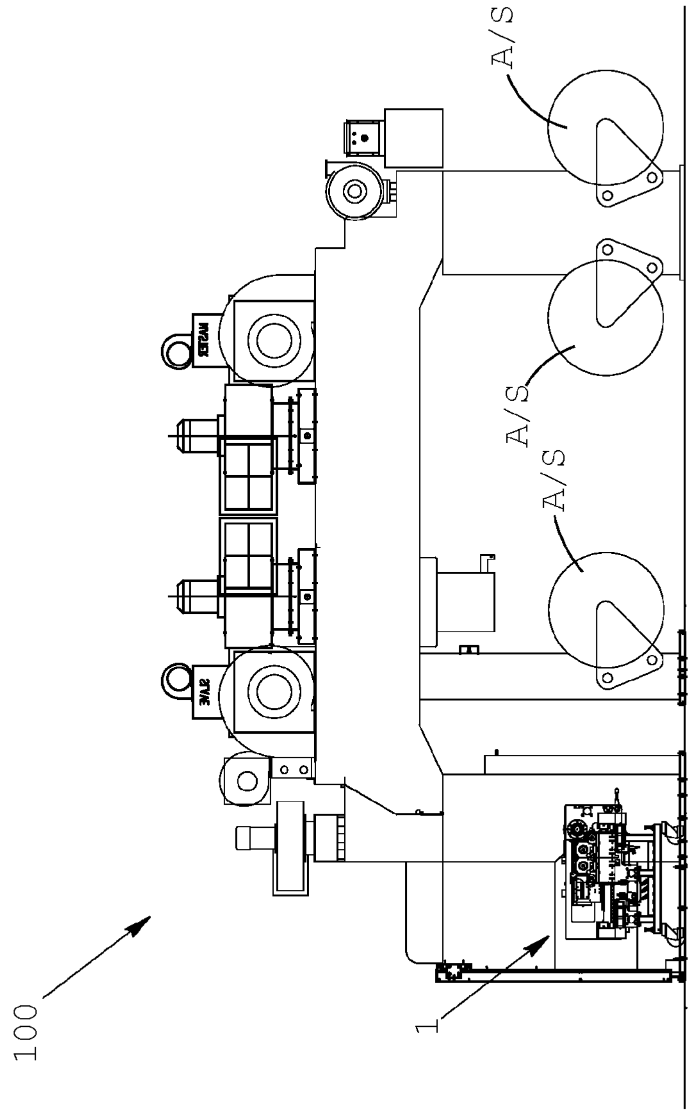
FIG. 7 is a schematic side view of a laminating machine equipped with the printing device according to the invention.

With reference to the accompanying FIGS. 1*a* and 1*b*, the number 1 indicates as a whole a printing device of the type adapted to be used preferably, but not exclusively, in association with a laminating machine 100 or the like, as illustrated in FIG. 7.

The device essentially comprises a support structure 10 with a pair of shoulders 10*a*, 10*b* supported by a trolley frame 11 equipped with wheels 12. A blade 13, an Anilox roller 14, a print roller 30 and a counter-pressure roller 15 are mounted on the shoulders 10*a*, 10*b*.

In the variant illustrated, the counter-pressure roller 15 is mounted to be able to rotate about its axis Xp directly on the shoulders 10*a*, 10*b*. The counter-pressure roller is rotated by a motor, by means of a belt transmission, not illustrated in the figures. The position of the counter-pressure roller with respect to the shoulders 10*a*, 10*b* is therefore substantially fixed.

The Anilox roller 14 is instead supported at its ends, so that it can rotate about its axis Xa, by a pair of first supports 16*a*, 16*b*. The blade chamber 13 is preferably also mounted on the first supports 16*a*, 16*b*.

Said blade chamber 13 defines a compartment 17 that acts as tank for containing printing ink. The compartment 17 has at least one slot shaped opening 17*a*, facing the Anilox roller 14, which places the surface thereof in communication with the ink in the compartment 17.

Said opening 17*a* is delimited transversely by at least one blade 18, preferably by a pair of blades 18. The Anilox roller 14 is arranged so as to rotate substantially in contact with said blades 18, which have the function of distributing the ink uniformly in the micro cavities or cells made on its surface. The blade chamber 13 is preferably movingly mounted on the first supports 16*a*, 16*b* so that it can be moved away from or toward the Anilox roller 14.

The Anilox roller 14 is rotated by a first motor 19, preferably of brushless type, through a transmission comprising a belt 20, a first pulley connected to the first motor 19, not visible in the figures, and a second pulley 21 connected to the Anilox roller 14.

The first supports 16*a*, 16*b*, are mounted sliding on the shoulders 10*a*, 10*b* along a direction substantially horizontal and perpendicular to the axis Xa of the Anilox roller 14. More in detail, said supports 16*a*, 16*b* are each provided with at least two, and preferably at least three, slides 22*a*, 22*b* sliding on respective guides 23*a*, 23*b* fixed to the shoulders 10*a*, 10*b*.

The movement of the first supports 16*a*, 16*b* is controlled by a pair of motors 24, each acting on one of the supports by means of a transmission. In the variant illustrated, said transmission comprises a first pulley 25 connected to the shaft of the motor 24, a belt 26, a second pulley 27 and a recirculating ball screw 28, moved by the second pulley 27, which engages a nut mounted on the support 16*a*, 16*b*.

The print roller 30 is interposed between the Anilox roller 14 and the counter-pressure roller 15. In a similar manner to the Anilox roller 14, the print roller is also supported at the ends by a pair of second supports 31*a*, 31*b* mounted sliding on the shoulders 10*a*, 10*b*. In the variant illustrated, each support is provided with at least two, and preferably at least three, slides 29*a*, 29*b* that slide on the same guides 23*b*, 23*b* as the first supports 16*a*, 16*b*.

The print roller 30 comprises a cliché-holder cylinder 32 (hereinafter also simply "cylinder 32"), preferably hollow inside, with two end shafts 33, 40. One of said shafts, defined here as second shaft 33, is in one piece with the cliché-holder cylinder 32. The other shaft, defined as first shaft 40, can instead be coupled to the cylinder 32.

This construction solution allows the first shaft to be shaped in the most convenient way and at the same time makes it possible to connect/fix certain components thereto, during assembly of the machinery, before it is coupled to the rest of the cylinder.

Figure 5:
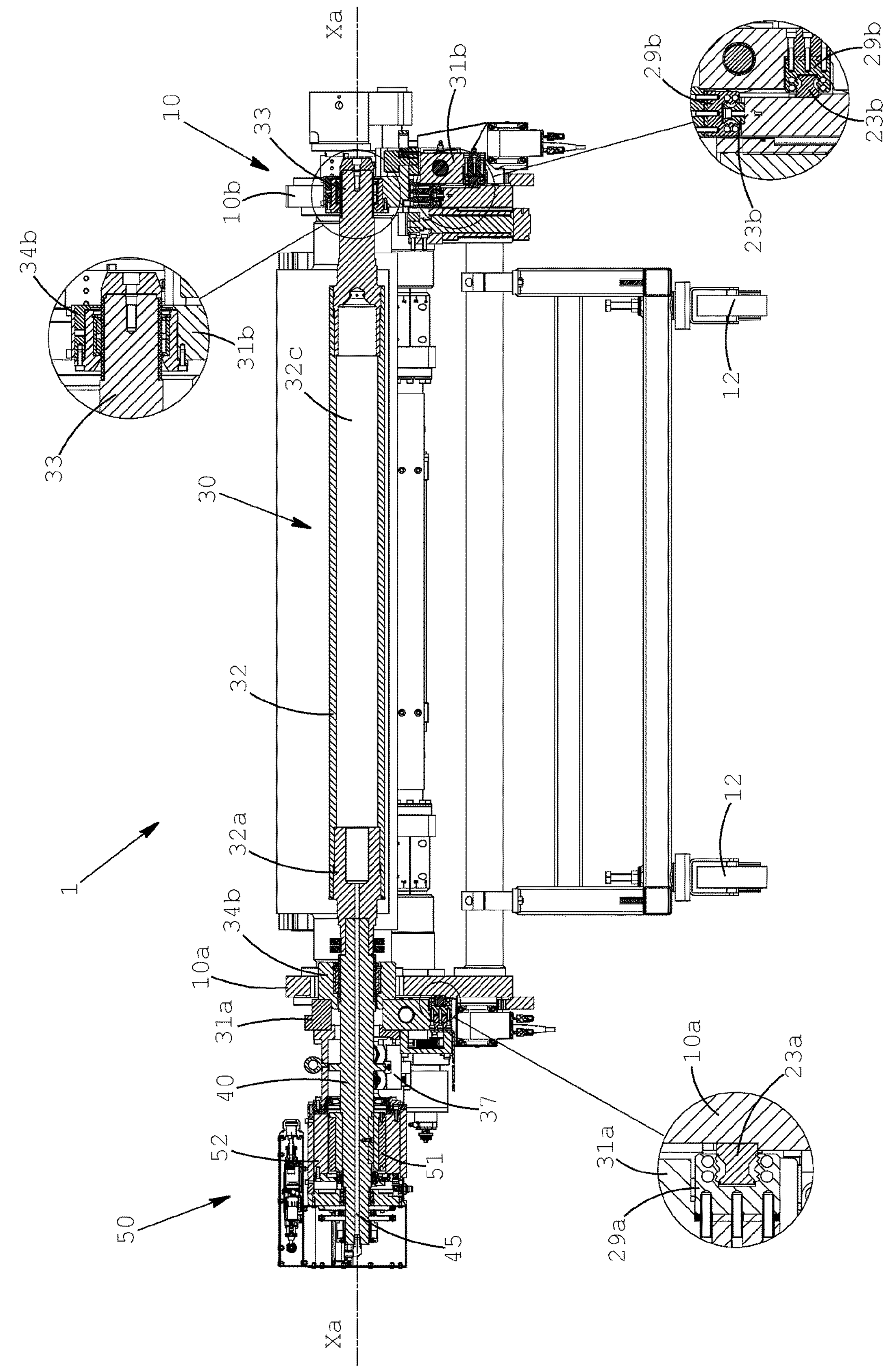
FIG. 5 is a view of the device according to the invention, sectioned along a vertical plane passing through the axis of rotation of the print roller.
Figure 6:
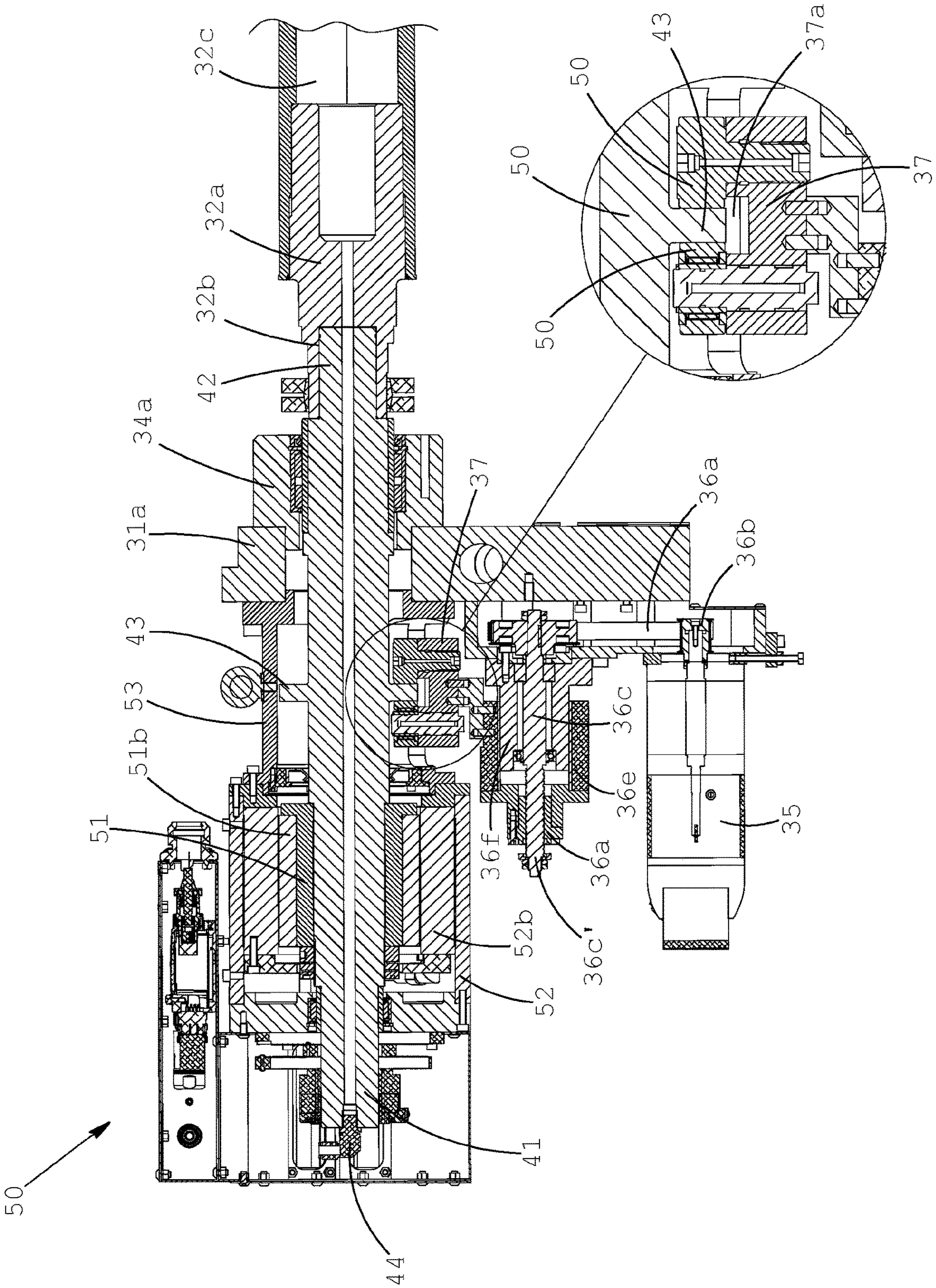
FIG. 6 is a detail view of the print roller, sectioned along a vertical plane passing through its axis of rotation.

More in detail, the cylinder 32 comprises a coupling portion 32*a* with a seat 32*b* adapted to accommodate an end portion of 42 of the first shaft. Coupling between the parts typically takes place by means of a shrink disc or other systems by means of which said parts, shaft 40 and cylinder 32, become one piece both in rotation and axially (FIGS. 5 and 6).

The print roller 30, and more precisely its shafts 33, 40, are mounted on the respective supports 31*a*, 31*b* by means of flanges 34*a*, 34*b* that allow said print roller 30 both to rotate around its axis Xs and to translate along said axis for a travel of a few millimetres, typically from 10 mm to 20 mm.

To allow the axial movement of the shafts 33, 40, said flanges are preferably equipped with rolling means, such as radial roller bearings.

This movement is managed by a position adjustment system comprising a motor 35 which, by means of a transmission 36, operates a control member 37 movable along a direction parallel to the axis Xs of the print roller 30.

According to a preferred variant, the transmission 36 comprises a pulley 36*b*, connected to the motor 35 by means of a belt 36*a*, which rotates a shaft 36*c* arranged with its axis parallel to the axis Xs. Said shaft 36*c* comprises a threaded portion 36*c*' that engages a lead screw 36*d* in one piece with a slider 36*e* sliding along the axis of the shaft 36*c*. Said threaded portion 36*c*' of the shaft 36*c* and the lead screw 36*d* are preferably of recirculating ball type.

The slider 36*e* preferably has a hollow cylindrical shape and is slidingly coupled to a cylindrical support 36*f* fixed in one piece to one of the sliding supports 31*a*, 31*b* of the print roller 30, in particular to the support 31*a* in the example in the figures.

The slider 36*e* is in turn connected to the control member 37.

Said control member 37 is adapted to engage an insert 43 in one piece with, and which projects radially from, the first shaft 40 of the print roller 30. In a preferred variant, said insert 43 is disc shaped, preferably substantially cylindrical. Said insert 43 can be in one piece with the first shaft 40 or made in it, as in the example illustrated.

The moving member 37 is preferably in the shape of a cradle, a jaw or the like that at least partly surrounds the insert 43. For example, the moving member can comprise a body with a circular shaped sector in which a housing 37*a* to accommodate the insert 43 is made. Rotation of the motor 35 in one direction or the other causes the movement of the slider 36*e*, which drives the control member 37 in a direction parallel to the axis Xs which, in turn, rests on the insert 43 to move the first shaft 40 and the rest of the print roller 30 along the axis Xs.

The moving member 37 is preferably provided with contact elements 37*b* in the form of a wheel, which remain substantially in contact with the outer surfaces of the insert 43, allowing it to rotate freely.

The longitudinal movement of the print roller, or of the supports 31*a*, 31*b*, is controlled by a pair of motors 38, each acting on one of the supports by means of a transmission. Said transmission, similarly to the Anilox roller 14, comprises a first pulley 38*a* connected to the shaft of the motor 38, a belt 38*b*, a second pulley 38*c* and a recirculating ball screw 39, moved by the second pulley 38*c*, which engages the nut, not shown in the figure, mounted on the supports 31*a*, 31*b*.

According to a preferred variant, the first shaft 40 has an internal passage 45 passing through it completely from a first free end 41 to the opposite end 42, i.e., the end connected to the cliché-holder cylinder 32.

Said passage 45 allows the internal cavity 32*c* of the cliché-holder cylinder to communicate with a source of compressed air. Advantageously, said source of air can be connected by means of a connector 44 fixed to the end of the passage 45 that ends on the free end 42 of the first shaft. As mentioned above, the air introduced into the cavity 32*c* of the cliché-holder cylinder 32 flows out through holes that pass through the surface of the cylinder, not visible in the figures, to create an air cushion that facilitates sliding of the cliché-holder sleeve.

The print roller 30 is rotated by an electric motor, indicated as a whole with 50. In accordance with a preferred embodiment of the invention, said motor 50 comprises a ring rotor 51 fitted directly onto the first shaft 41 and a ring stator 52, in one piece with the sliding support 31*a* of the print roller 30, arranged around the rotor 51. The motor is preferably a permanent magnet motor, with the permanent magnets 51*b* held by the rotor 51. Instead, the stator 52 holds the windings 52*a* of the motor. Typically, the motor 50 is a torque motor. In fact, this type of motor can be fitted directly onto the first shaft 40 without the need for transmission members or connection elements, with the aforementioned advantages in relation to precision of movement and absence of vibrations. In addition to this, positioning of the motor in an area at a distance from the end of the shaft, allows, as in the case of the invention, this end 41 to be uncovered and made accessible, for connection of the source of air as described above.

Moreover, this type of motor makes it possible to limit the overall axial dimensions and, consequently, the length of the first shaft 40 that extends laterally from the shoulders 10*a*, 10*b* of the device.

The stator 52 is fixed to the sliding support 31*a* by means of a flange 53, which preferably also acts as a cover for the control member 37 that controls the axial translation movement of the first shaft 40.

The rotor 51 is mechanically released from the stator 52 and from the support flange 53 so as to be able to move along its rotation axis, coincident with the axis Xs, driven by the first shaft 40.

FIG. 7 illustrates a laminating machine 100 in which the printing device according to the invention is installed. Typically, the printing device is positioned in the area of the laminating machine that is usually occupied by the glue spreading unit (not illustrated) when the machine operates to laminate layers of film. In fact, when it is necessary to carry out reprinting on the film, laminated or to be laminated, this spreading unit can be temporarily removed and the printing device 1 positioned in its place.

In this way it is possible to make use of components already present on the laminating machine, such as winders and unwinders, guide rollers, tensioners, motors, sensors, etc.

The invention has been described purely for non-limiting illustrative purposes, according to some preferred embodiments. The person skilled in the art may find many other embodiments and variants, all falling within the scope of protection of the appended claims.

The invention claimed is:

1. A movable-type flexographic printing device, adapted to be used in association with a laminating machine, comprising at least:

a support structure that includes at least one pair of shoulders mounted on a trolley frame;

a blade chamber that defines a tank for containing printing ink;

an Anilox roller, a surface of which is in communication with the tank of the blade chamber so that, rotating around an axis of the Anilox roller, a quantity of ink remains adhering to said surface;

a print roller, adapted to hold a printing cliché, which can rotate around an axis of the print roller in contact with the Anilox roller so that a layer of ink is deposited onto a surface of said cliché;

a counter-pressure roller that can rotate in contact with the cliché held by the print roller;

at least one first motor capable of rotating the Anilox roller; and at least one second motor capable of rotating the print roller, wherein ends of the Anilox roller and the print roller are supported by respective sliding supports that can slide with respect to the shoulders of the support structure in a direction substantially orthogonal to the axes of said Anilox and print rollers, wherein the print roller is mounted on the sliding supports thereof in a manner so as to translate along an axial direction, wherein the print roller comprises a cliché-holder cylinder supported at ends thereof by two shafts, a first shaft of said two shafts being stably mounted on one of the sliding supports and being configured to be coupled with the cliché-holder cylinder, the second motor being connected to said first shaft, and the printing device further comprising a position adjustment system adapted to control a movement of the print roller along said axial direction, said position adjustment system comprising a third motor connected to a control member movable along a direction parallel to the axis of the print roller, said control member engaging an insert that is either one piece with or made in the first shaft of the print roller in order to move said print roller along said axial direction.

2. The movable-type flexographic printing device according to claim 1, wherein the second motor comprises a i) ring rotor fitted directly onto said first shaft, and ii) a ring stator, which wraps around said ring rotor, in one piece with said one of the sliding supports of the print roller.

3. The movable-type flexographic printing device according to claim 2, wherein the cliché-holder cylinder has an internal cavity, and wherein there is a passage in the first shaft, which extends parallel to the axis of the print roller, a first end of which ends at a free end of said first shaft, and a second end of which, opposite the first end, communicates with the cavity of the cliché-holder cylinder, said first passage end being connectable to a source of compressed air.

4. The movable-type flexographic printing device according to claim 3, wherein each of said respective sliding supports is connected to respective shoulders by means of a pair of sliding guides.

5. The movable-type flexographic printing device according to claim 3, wherein an active part of the ring rotor of the second motor has a length, in the axial direction, greater than that of the ring stator, by a length at least equal to a maximum axial movement that said print roller can make, so that following said axial movement a maximum torque of the second motor remains substantially unchanged.

6. The movable-type flexographic printing device according to claim 2, wherein an active part of the ring rotor of the second motor has a length, in the axial direction, greater than that of the ring stator, by a length at least equal to a maximum axial movement that said print roller can make, so that following said axial movement a maximum torque of the second motor remains substantially unchanged.

7. The movable-type flexographic printing device according to claim 6, wherein each of said respective sliding supports is connected to respective shoulders by means of a pair of sliding guides.

8. The movable-type flexographic printing device according to claim 2, wherein each of said respective sliding supports is connected to respective shoulders by means of a pair of sliding guides.

9. The movable-type flexographic printing device according to claim 1, wherein each of said respective sliding supports is connected to respective shoulders by means of a pair of sliding guides.

* * * * *